United States Patent Office 3,227,565
Patented Jan. 4, 1966

3,227,565
PROCESS FOR MANUFACTURING STABILIZED CERAMICLIKE PRODUCTS FROM GLASS BY MICROSCOPIC CRYSTALLIZATION
Hideo Tanigawa, 1 7-chome, Yanagi-dori, Nishinari-ku, Osaka, Japan, and Hirokichi Tanaka, Osaka Kogyogijutsushikenjo Ikeda Bunsho-nai 330, Saita-machi, Ikeda, Japan
No Drawing. Filed Aug. 8, 1961, Ser. No. 129,980
Claims priority, application Japan, Aug. 13, 1960, 35/34,530
1 Claim. (Cl. 106—39)

The present invention is concerned with a process for manufacturing ceramiclike products from glass by producing microscopic crystals therein.

As disclosed in the prior art, it is known that ceramiclike products of high strength can be obtained by making glass separate microscopic crystals within the bulk thereof, using as an agent that provides nuclear crystallites or a nucleus-former, so to speak, some metals such as gold, silver and copper or particular sorts of inorganic compounds such as $TiO_2$. However, such metals as above mentioned are rather expensive, and when $TiO_2$ is used as a substitute thereof, there is a tendency that the amount of microscopic crystals produced in the glass is restricted within a rather small proportion and at the same time it is necessary to employ such a glass composition as contains a considerable amount of expensive $Li_2O$ as an ingredient, so that the thus obtained products will become inevitably expensive.

It is, therefore, one object of the present invention to provide a process for manufacturing ceramiclike products from glass by producing microscopic crystals therein. The ceramiclike products are not only producible at moderate prices and in large quantities but also compatible with those of the prior art in respect of the mechanical strength.

It is another object of the present invention to provide a process for manufacturing ceramiclike products from glass by producing microscopic crystals therein on the basis of the discovery of the fact that fluor spar ($CaF_2$), which is quite inexpensive, is able to be used as nucleus-former not only in the state of crude ore, but with a noticeable advantage of substantial curtailment of the use of costly $Li_2O$ in the glass composition as raw material.

The present invention is thus concerned with a process for manufacturing ceramiclike products wherein a glass obtained by fusing three constituents of $SiO_2$, $Al_2O_3$ and $CaF_2$ amounting respectively to 48–72%, 20–29% and 8–29% by weight together with further additions of $Li_2O$ and $PbO$ amounting respectively to 2–7% and 0.2–0.5% by weight is exposed to a temperature below its softening point but above its transition point to produce nuclear crystallites and then kept at a temperature slightly lower than the softening point of the product to multiply fine crystals thus given rise to.

According to the present invention, a small quantity of $PbO$ is added as stabilizer to the new composition prepared by mixing together finely powdered raw materials of silica ($SiO_2$), alumina ($Al_2O_3$), fluor spar ($CaF_2$) and $Li_2O$ in the abovementioned ranges of proportion and hence containing $Li_2O$ which is particularly high in price only in a small proportion. Batches for compositions thus completed were individually melted in a small resistance-heated furnace for 2–3 hours at a temperature of 1,300° C.–1,500° C. and the resulting glass was worked by pressing and drawing in the conventional manner to desired form, respectively.

Appropriate samples of each glass were subjected to the following heat treatment. Samples of the glasses were nucleated by heating them in an electrically heated muffle the temperature of which was uniformly increased at the rate of 300° C. per hour from room temperature until they acquire a temperature below the softening point but above the transition point of the samples, where they were held for 1–2 hours. The temperature of the muffle was then uniformly raised at 150° C. per hour to 920°–940°, where it was held for 2 hours. In regard to the abovementioned thermal treatment, it may be said that: The first working step of producing nuclear crystallites of $CaF_2$ can be carried out most effectively when the shaped glass articles, heated at a speed of 300° C./hr., are kept at a temperature lower by 10° C. than their softening point, as supported by the presence of a $CaF_2$ deposit confirmed by an X-ray analysis of the glass exhibiting a faint milky turbidity as an implication of the production of nuclear crystallites in this stage of thermal treatment.

The operation for inducing the multiplication of fine crystals in the products can be accomplished most effectively by subjecting the hot products just freed from the mentioned first treatment to a thermal treatment consisting of raising the temperature at a rate of 150° C./hr. followed by keeping the products for 2 hours at a temperature of 920–940° C. which is lower by about 50° C. than their softening point, in which final stage of treatment the multiplication of fine crystals is completed. Results of X-ray analysis of the glass distinctly show that the fine crystals deposited in this stage of thermal treatment are of β-spodumene and calcium compounds other than $CaF_2$, indicating that the nuclear crystallites of $CaF_2$ have become covered with fine crystals of these substances multiplied to such a great extent as makes the pattern of $CaF_2$ undiscernible at all. As to the possible deformation of shaped articles induced in the course of the thermal treatment, the extent of its occurrence is quite negligible because the change in density can proceed only at a slow rate and in a minute degree.

The abovementioned type of thermal treatment of the abovementioned composition of glass according to the present invention can be very economically performed on account not only because it enables fluor spar ($CaF_2$), which is obtainable as an ore requiring no special refining and available as a non-expensive agent capable of forming nuclear crystallites, to be directly used as a raw material, but also because it requires neither the use of costly lithium in an amount no more than 2–7% nor special addition of any material economically incompatible with fluor spar as crystal nuclei producer. The abovementioned economical merits of the method of the present invention are further combined with the advantage that the products obtained thereby are possessed of various virtues as, for example, the smallness in thermal expansibility and the greatness in mechanical strength.

It should be noticed that even the above specified conditions of thermal treatment are only able to give such products as possessed of smaller strengths when they are applied to the compositions made of constituents either above or below the above specified respective ranges of proportion because of the excessive growth of crystal nuclei taking place in that case.

Some of the compositions adopted and the properties of the products obtained according to the present invention will be illustrated in the following table.

| No. of experiment | 1 | 2 | 3 | 4 | 5 | 6 |
|---|---|---|---|---|---|---|
| Composition | | | | | | |
| $SiO_2$ | 72 | 69 | 66 | 63 | 60 | 57 |
| $Al_2O_3$ | 20 | 20 | 20 | 20 | 20 | 20 |
| $CaF_2$ | 8 | 11 | 14 | 17 | 20 | 23 |
| $Li_2O$ | 5 | 5 | 5 | 5 | 5 | 5 |
| $PbO$ | 0.2 | 0.2 | 0.2 | 0.2 | 0.2 | 0.2 |
| For shaped products before heating | | | | | | |
| Rate of heat expansion per °C×10⁻⁷ | ------ | 57.1 | 59.1 | 61.8 | 65.4 | 68.6 |
| Flexion strength (kg./cm.²) | ------ | 640 | 623 | 618 | 633 | 603 |
| For shaped products after heating | | | | | | |
| Rate of heat expansion per °C×10⁻⁷ | ------ | 24.6 | 29.6 | 38.5 | 39.4 | 42.1 |
| Flexion strength (kg./cm.²) | ------ | 1,715 | 1,530 | 2,213 | 2,228 | 2,298 |

| No. of experiment | 7 | 8 | 9 | 10 | 11 | 12 |
|---|---|---|---|---|---|---|
| Composition | | | | | | |
| $SiO_2$ | 54 | 51 | 48 | 69 | 66 | 63 |
| $Al_2O_3$ | 20 | 20 | 20 | 23 | 23 | 23 |
| $CaF_2$ | 26 | 29 | 32 | 8 | 11 | 14 |
| $Li_2O$ | 5 | 5 | 5 | 5 | 5 | 5 |
| $PbO$ | 0.2 | 0.2 | 0.2 | 0.2 | 0.2 | 0.2 |
| For shaped products before heating | | | | | | |
| Rate of heat expansion per °C×10⁻⁷ | 72.5 | 77.5 | 82.5 | ------ | 58.2 | 61.0 |
| Softening temperature (°C) | 605 | 600 | 598 | ------ | 590 | 585 |
| For shaped products after heating | | | | | | |
| Rate of heat expansion per °C×10⁻⁷ | 43.9 | 45.8 | 48.5 | ------ | 28.4 | 31.5 |
| Flexion strength (kg./cm.²) | ------ | 2,094 | ------ | ------ | 1,273 | ------ |

| No. of experiment | 13 | 14 | 15 | 16 | 17 | 18 |
|---|---|---|---|---|---|---|
| Composition | | | | | | |
| $SiO_2$ | 60 | 57 | 54 | 51 | 43 | 66 |
| $Al_2O_3$ | 23 | 23 | 23 | 23 | 23 | 26 |
| $CaF_2$ | 17 | 20 | 23 | 26 | 29 | 8 |
| $Li_2O$ | 5 | 5 | 5 | 5 | 5 | 5 |
| $PbO$ | 0.2 | 0.2 | 0.2 | 0.2 | 0.2 | 0.2 |
| For shaped products before heating | | | | | | |
| Rate of heat expansion per °C×10⁻⁷ | 62.1 | 63.7 | 67.3 | 71.3 | 74.8 | ------ |
| Softening temperature (°C) | 600 | 613 | 630 | 625 | 620 | ------ |
| For shaped products after heating | | | | | | |
| Rate of heat expansion per °C×10⁻⁷ | 35.2 | 39.6 | 43.4 | 44.4 | 45.2 | ------ |
| Flexion strength (kg./cm.²) | 1,460 | ------ | 1,682 | 1,703 | ------ | ------ |

| No. of experiment | 19 | 20 | 21 | 22 | 23 | 24 |
|---|---|---|---|---|---|---|
| Composition | | | | | | |
| $SiO_2$ | 63 | 60 | 57 | 54 | 51 | 48 |
| $Al_2O_3$ | 26 | 26 | 26 | 26 | 26 | 26 |
| $CaF_2$ | 11 | 14 | 17 | 20 | 23 | 26 |
| $Li_2O$ | 5 | 5 | 5 | 5 | 5 | 5 |
| $PbO$ | 0.2 | 0.2 | 0.2 | 0.2 | 0.2 | 0.2 |
| For shaped products before heating | | | | | | |
| Rate of heat expansion per °C×10⁻⁷ | 58.6 | 60.7 | 68.2 | 66.5 | 69.4 | 72.8 |
| Softening temperature (°C) | 595 | 590 | 610 | 620 | 625 | 625 |
| For shaped products after heating | | | | | | |
| Rate of heat expansion per °C×10⁻⁷ | 12.0 | 17.2 | 22.7 | 26.1 | 30.7 | 37.6 |
| Flexion strength (kg./cm.²) | 950 | 834 | 1,313 | 1,405 | 1,712 | 1,802 |

| No. of experiment | 25 | 26 | 27 | 28 | 29 | 30 |
|---|---|---|---|---|---|---|
| Composition | | | | | | |
| $SiO_2$ | 60 | 57 | 54 | 51 | 48 | 48 |
| $Al_2O_3$ | 29 | 29 | 29 | 29 | 29 | 32 |
| $CaF_2$ | 11 | 14 | 17 | 20 | 23 | 20 |
| $Li_2O$ | 5 | 5 | 5 | 5 | 5 | 5 |
| $PbO$ | 0.2 | 0.2 | 0.2 | 0.2 | 0.2 | 0.2 |
| For shaped products before heating | | | | | | |
| Rate of heat expansion per °C×10⁻⁷ | 57.7 | 59.4 | 61.2 | 63.5 | ------ | ------ |
| Softening temperature (°C) | 620 | 605 | 593 | 573 | ------ | ------ |
| For shaped products after heating | | | | | | |
| Rate of heat expansion per °C×10⁻⁷ | 15.8 | 21.5 | 27.0 | 34.4 | ------ | ------ |
| Flexion strength (kg./cm.²) | ------ | 804 | ------ | 1,017 | ------ | ------ |

| No. of experiment | 31 | 32 | 33 |
|---|---|---|---|
| Composition | | | |
| $SiO_2$ | 54 | 54 | 54 |
| $Al_2O_3$ | 26 | 26 | 26 |
| $CaF_2$ | 20 | 20 | 20 |
| $Li_2O$ | 2 | 7 | 5 |
| $PbO$ | 0.2 | 0.2 | 0.5 |
| For shaped products before heating | | | |
| Rate of heat expansion per °C×10⁻⁷ | 62.8 | 78.5 | ------ |
| Softening temperature (°C) | 628 | 595 | ------ |
| For shaped products after heating | | | |
| Rate of heat expansion per °C×10⁻⁷ | 56.8 | 23.0 | ------ |
| Flexion strength (kg./cm.²) | 1,250 | 1,000 | ------ |

From the data in the table it may generally be ascertained as regards the products obtained with the glass of the composition specified by the present invention that, while the best result reflected in a low rate of thermal expansion as well as in a high flexion strength is obtained in the case of a product prepared by using $Li_2O$ as added in an amount of 5% by weight, a product prepared with added $Li_2O$ amounting to 2% by weight shows a value of a rate of heat expansion fairly larger than that shown by that containing $Li_2O$ of 5% by weight and a product prepared with added $Li_2O$ in an amount of 7% by weight gives a smaller value of flexion strength as compared with that containing $Li_2O$ of 5% by weight. As regards the properties of the glass with the composition specified according to the present invention, it may thus be said that the best result can be obtained when the glass contains $Li_2O$ in an amount of 5% by weight.

*Example*

Finely powdered raw materials consisting, respectively, of $SiO_2$, $Al_2O_3$, $CaF_2$, $Li_2O$ and PbO were mixed together in the proportions of 54%, 26%, 20%, 5% and 0.2% by weight, respectively (corresponding to the composition in Experiment No. 22 illustrated in the foregoing table). Batches for compositions thus prepared were individually melted in electric resistance-heated furnaces for 2-3 hours at 1,300° C.–1,500° C. and then formed by the routine technique. The rate of thermal expansion and softening temperature of the glass here obtained were estimated as $66.5 \times 10^{-7}$/°C. and 620° C., respectively. The above obtained configured article was placed in an electric furnace and heated from room temperature to 610° C. at a rate of 300° C./hr. and maintained at this temperature for 2 hours. The product thus obtained showed a rate of thermal expansion of $66.5 \times 10^{-7}$/° C. in accordance with that in the beginning. The product was then heated at a rate of 150° C./hr. and kept for 2 hours at 920° C. The final product thus obtained showed a rate of thermal expansion of $26.1 \times 10^{-7}$/° C. and a softening temperature of 990° C.

While we have disclosed several embodiments of the present invention, it is to be understood that these embodiments are given by example only and not in a limiting sense, the scope of the present invention being determined by the objects and the claim.

We claim:

A process for producing ceramiclike products from glass by microscopic crystallization comprising the steps of heating about 48 to 72% by weight of $SiO_2$, about 20 to 29% by weight of $Al_2O_3$ and about 8 to 29% by weight of $CaF_2$ jointly with about 2 to 7% by weight of $Li_2O$ and about 0.2 to about 0.5% by weight of PbO for 2-3 hours at a temperature range of about 1,300° C. to 1,500° C. in order to fuse said material, forming said material into any predetermined shape, heating said shaped material at a rise of 300° C./hr. to a temperature below the softening point of about 620° C. thereof, yet above the transition point of said glass, to produce nuclear crystallites consisting of $CaF_2$, and maintaining said material at said last mentioned temperature for about 1-2 hours to effect the production of nuclear crystallites, then heating the latter at a rate of about 150° C./hr. to a temperature of 920° C.–940° C., maintaining said temperature for about 2 hours to produce fine crystallites to be multiplied at said temperature.

References Cited by the Examiner

UNITED STATES PATENTS

| | | | |
|---|---|---|---|
| 2,920,971 | 1/1960 | Stookey | 106—39 |
| 3,006,775 | 10/1961 | Chen | 106—39 |

SAMUEL H. BLECH, *Primary Examiner.*

JOSEPH REBOLD, JOHN R. SPECK, TOBIAS E. LEOW, *Examiners.*